H. O. TAFT.
JACK SPOOL AND FASTENER.
APPLICATION FILED JULY 22, 1913.
1,100,504.
Patented June 16, 1914.
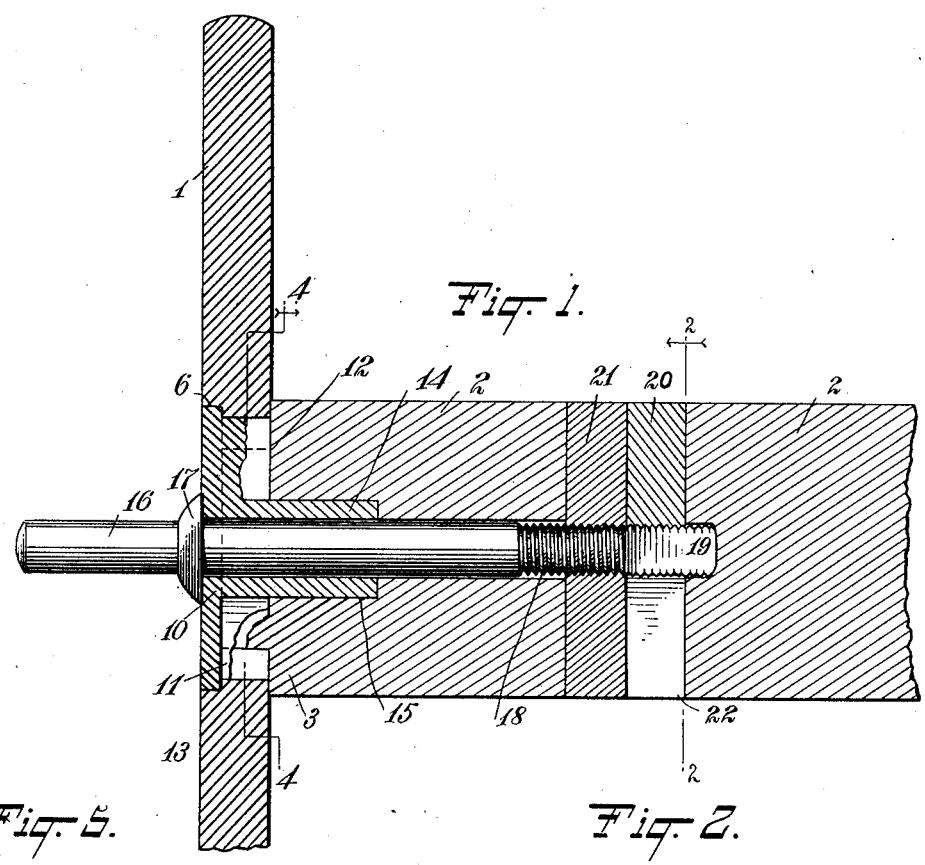
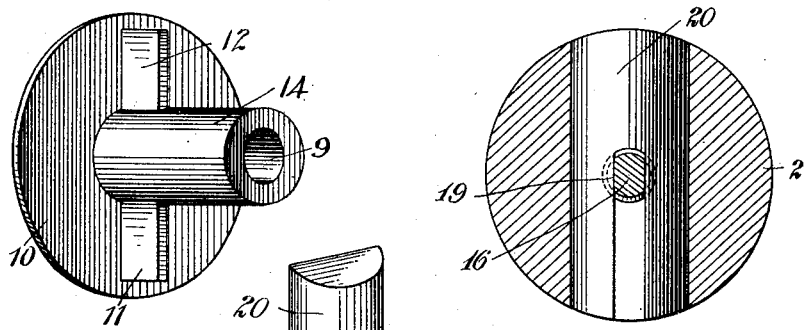
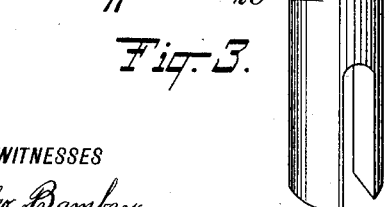
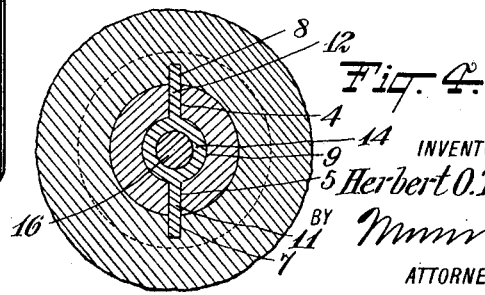
WITNESSES
Geo. Bambay.
A. L. Kitchin
INVENTOR
Herbert O. Taft
BY Munn & Co
ATTORNEYS
COLUMBIA PLANOGRAPH CO., WASHINGTON, D. C.

UNITED STATES PATENT OFFICE.

HERBERT OTHRO TAFT, OF BURLINGTON, VERMONT.

JACK-SPOOL AND FASTENER.

1,100,504.  Specification of Letters Patent.  Patented June 16, 1914.

Application filed July 22, 1913. Serial No. 780,482.

*To all whom it may concern:*

Be it known that I, HERBERT O. TAFT, a citizen of the United States, and a resident of Burlington, in the county of Chittenden and State of Vermont, have invented a new and Improved Jack-Spool and Fastener, of which the following is a full, clear, and exact description.

This invention relates to improvements in jack spools and fasteners, and has for an object to provide an improved structure which will not become loose, so that the head and gudgeon cannot grind against the cylinder.

Another object of the invention is to provide a gudgeon and a lock for preventing the rotation thereof whereby the head is held rigidly connected with the cylinder of the spool and none of the parts are allowed independent movement.

In carrying out the object of the invention the spool is formed with a cylinder having a bifurcated projection extending into the head which is formed with an opening, and with slots registering with the space between the bifurcations of the end of the cylinder. Fitting into the end of the cylinder is a bearing member for the gudgeon which is formed with lugs or wings designed to fit into the space between the bifurcations of the cylinder and the notches in the head, whereby the head and cylinder are prevented independent rotation. The gudgeon acts as a binding or clamping screw to be held in place by a suitable nut. However, this gudgeon is flattened so as to receive a bifurcated locking washer fitted against the flattened portion and arranged in the body of the cylinder.

In the accompanying drawing,—Figure 1 is a longitudinal vertical section through one end of a spool embodying the invention; Fig. 2 is a section through Fig. 1 on line 2—2; Fig. 3 is a detailed perspective view of the locking washer; and Fig. 4 is a section through Fig. 1 on line 4—4; Fig. 5 is a perspective view of a bearing member embodying certain features of the invention.

Referring to the accompanying drawings by numeral 1 indicates a head which may be of any desired material, and 2 a cylinder which also may be of any desired size and material. The cylinder 2 is provided with an extension 3 having radial slots 4 and 5. Head 1 is formed with a recessed portion 6 and radial slots 7 and 8 designed to register with slots 4 and 5, in extension 3 which projects through the central opening 9 in head 1. A bearing member 10 is provided formed with a disk-shaped head 11 fitting into the notched-out portion 6, and with wings or arms 12 and 13 fitting into the radial notches 4, 5, 7 and 8 when the same are alined, and with a central tubular member 14 designed to fit into a bore 15 in cylinder 2. The tubular member 14 is designed to act as a bearing for the gudgeon 16, which gudgeon is formed with a stop 17, and with a threaded end 18. End 18 is also formed with flattened sides 19 so as to accommodate the locking washer 20. A nut 21 is threaded on to end 18, and during the assembling the gudgeon 16 is rotated until stop 17 tightly presses the bearing member 10 against head 1. After the parts have been properly assembled, except for washer 20, the washer is then placed in position in the aperture 22 provided in cylinder 2. By providing the flattened portions 19 and the locking washer 20 the gudgeon 16 cannot rotate in either direction, and consequently holds the same tightly against cylinder 2 and holds the bearing member 10 properly in place so that the head cannot rotate independent of cylinder 2, nor can any of the other parts move independently of cylinder 2.

Having thus described my invention, what I claim as new and desire to secure by Letters Patent—

1. In a jack spool, a body formed with an extension having radial slots, said body having a longitudinal bore at the end, a head formed with an aperture registering with said longitudinal bore, a radial extension registering with said radial slots, a bearing member formed with wings fitting into said radial extensions and said radial slots so as to lock said body and said head together, said bearing member being formed with a tubular extension surrounding the longitudinal bore in said body and extending an appreciable distance into said body, a gudgeon for clamping said head to said body and for acting as an axle for said body, and means carried by said body and engaging said gudgeon for preventing an independent rotation thereof.

2. In a jack spool, a body formed with a longitudinal bore with an enlargement at one end of the body, a head arranged at the end of said body, said head being formed with notches therein, a bearing member formed with wings fitting into said notches, and with a tubular extension fitting into said enlargement of said bore, whereby the strain on said bearing member is distributed over an appreciable area of said body, a gudgeon extending through said bearing member and into said bore in said body, and means for holding said gudgeon in place.

In testimony whereof I have signed my name to this specification in the presence of two subscribing witnesses.

HERBERT OTHRO TAFT.

Witnesses:
C. D. ORDWAY,
HENRY D. HENDEE.